US011097596B2

(12) United States Patent
Takeuchi et al.

(10) Patent No.: US 11,097,596 B2
(45) Date of Patent: Aug. 24, 2021

(54) VEHICLE EQUIPPED WITH ELECTRIC MOTOR

(71) Applicant: HONDA MOTOR CO., LTD., Tokyo (JP)

(72) Inventors: Yoshiyuki Takeuchi, Wako (JP); Yoshihisa Tsuchiya, Wako (JP); Kenzo Kimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 162 days.

(21) Appl. No.: 16/217,217

(22) Filed: Dec. 12, 2018

(65) Prior Publication Data
US 2019/0202261 A1 Jul. 4, 2019

(30) Foreign Application Priority Data

Dec. 28, 2017 (JP) .............................. JP2017-254243

(51) Int. Cl.
*B60H 1/00* (2006.01)
*B60L 7/14* (2006.01)
(Continued)

(52) U.S. Cl.
CPC .......... *B60H 1/00814* (2013.01); *B60L 1/003* (2013.01); *B60L 1/02* (2013.01);
(Continued)

(58) Field of Classification Search
CPC ................ B60H 1/00814; B60H 1/143; B60H 1/00885; B60H 1/00764; B60H 1/00385;
(Continued)

(56) References Cited

U.S. PATENT DOCUMENTS

| 2012/0060522 A1* | 3/2012 | Markowitz | ........ B60H 1/00778 |
| | | | 62/79 |
| 2013/0192272 A1* | 8/2013 | Ranalli | ................. B60L 3/0061 |
| | | | 62/3.3 |

(Continued)

FOREIGN PATENT DOCUMENTS

| JP | 2008-120244 | 5/2008 |
| JP | 2013-177101 | 9/2013 |

(Continued)

OTHER PUBLICATIONS

Japanese Office Action for Japanese Patent Application No. 2017-254243 dated Jun. 18, 2019.

*Primary Examiner* — Rami Khatib
*Assistant Examiner* — Gabriel J Lambert
(74) *Attorney, Agent, or Firm* — Amin, Turocy & Watson, LLP

(57) ABSTRACT

A vehicle equipped with an electric motor includes an electric motor, an electrical storage device, an air-conditioning device, a heat source cooling circuit and a controller. The air-conditioning device includes a heater core, an air conditioning hot liquid circuit that causes a thermal medium liquid to flow through the heater core, and a temperature raising device that raises a temperature of the thermal medium liquid and cause electric power consumption. When regenerative braking is performed by the electric motor when a state of charge of the electrical storage device is a predetermined value or more, the controller raises a temperature of the thermal medium liquid using the temperature raising device and switches connection and shutting between the air conditioning hot liquid circuit and the heat source cooling circuit according to a temperature of the thermal medium liquid in the air conditioning hot liquid circuit and the heat source cooling circuit.

5 Claims, 9 Drawing Sheets

(51) Int. Cl.
    *B60W 10/18*      (2012.01)
    *B60W 10/30*      (2006.01)
    *B60L 50/51*      (2019.01)
    *B60L 1/00*      (2006.01)
    *B60L 7/10*      (2006.01)
    *B60L 1/02*      (2006.01)
    *B60L 58/15*      (2019.01)

(52) U.S. Cl.
    CPC ............... *B60L 7/10* (2013.01); *B60L 7/14* (2013.01); *B60L 50/51* (2019.02); *B60L 58/15* (2019.02); *B60W 10/18* (2013.01); *B60W 10/30* (2013.01); *B60L 2240/34* (2013.01); *B60L 2240/36* (2013.01)

(58) Field of Classification Search
    CPC ....... B60H 1/00428; B60L 1/003; B60L 7/10; B60L 1/02; B60L 58/15; B60L 50/51; B60L 7/14; B60L 2240/34; B60L 2240/36; B60W 10/18; B60W 10/30; B60R 16/033
    See application file for complete search history.

(56) References Cited

U.S. PATENT DOCUMENTS

| | | | |
|---|---|---|---|
| 2014/0070013 | A1 | 3/2014 | Stanek et al. |
| 2014/0216709 | A1* | 8/2014 | Smith ............... B60H 1/00278 165/287 |
| 2017/0036514 | A1* | 2/2017 | Umehara ............. B60W 10/30 |
| 2017/0129307 | A1* | 5/2017 | Zhou .................... B60H 1/3201 |
| 2017/0259806 | A1* | 9/2017 | Kava ..................... B60K 6/365 |
| 2018/0001784 | A1* | 1/2018 | Porras ..................... B60K 1/04 |
| 2018/0037218 | A1* | 2/2018 | Sugimoto ........ B60W 30/18127 |
| 2018/0258874 | A1* | 9/2018 | Okamoto ............... F02D 29/02 |
| 2019/0061543 | A1* | 2/2019 | Jovet .................... B60L 53/302 |
| 2019/0329655 | A1* | 10/2019 | Petrak ................. B60L 15/2009 |
| 2020/0108686 | A1* | 4/2020 | Badger, II .............. B60L 50/61 |

FOREIGN PATENT DOCUMENTS

| | | |
|---|---|---|
| JP | 5673261 | 2/2015 |
| JP | 2015-209029 | 11/2015 |
| JP | 2017-093154 | 5/2017 |

\* cited by examiner

VEHICLE EQUIPPED WITH ELECTRIC MOTOR

CROSS-REFERENCE TO RELATED APPLICATION

Priority is claimed on Japanese Patent Application No. 2017-254243, filed Dec. 28, 2017, the content of which is incorporated herein by reference.

BACKGROUND OF THE INVENTION

Field of the Invention

The present invention relates to a vehicle equipped with an electric motor, in which regenerative braking is possible, such as a hybrid vehicle, an electric vehicle, or the like.

Description of Related Art

In a vehicle equipped with an electric motor such as a hybrid vehicle, an electric vehicle, or the like, a configuration in which an electric motor functions as a generator upon braking of a vehicle is known. In such a vehicle equipped with an electric motor, rotation of a driving wheel is transmitted to an output shaft of the electric motor, and electric power is regenerated by the electric motor due to rotation of the output shaft. Regenerated alternating current is converted into direct current by an inverter, and the converted direct current is charged in an electrical storage device.

In addition, in the vehicle equipped with an electric motor, since the electrical storage device is protected from overcharge, when a state of charge of the electrical storage device exceeds a predetermined value, a regeneration amount in the electric motor is restricted. However, when a regeneration amount by the electric motor is restricted, a regenerative braking force is weakened more than usual, and an uncomfortable feeling due to a variation in a brake feeling is given to an occupant. Meanwhile, prior to minimization of a variation in a brake feeling, when a limitation of a regeneration amount during braking is removed, it causes deterioration of the electrical storage device due to overcharge.

As a countermeasure, a means configured to increase electric power consumption of an electric load of the vehicle equipped with an electric motor when the state of charge of the electrical storage device is the predetermined value or more upon regenerative braking is proposed (for example, see Japanese Patent No. 5673261).

The vehicle equipped with an electric motor disclosed in Japanese Patent No. 5673261 operates an electric heater (a temperature raising device) installed in a cooling circuit (a heat source cooling circuit) of a fuel cell and consumes surplus electric power by using the electric heater when the state of charge of the electrical storage device is the predetermined value or more upon regenerative braking. In addition, a thermal medium liquid in the cooling circuit heated by the electric heater passes through a heater core of the air-conditioning device, and exchanges heat with conditioning air in the heater core.

SUMMARY OF THE INVENTION

The vehicle equipped with an electric motor in the related art operates the temperature raising device (the electric heater) configured to raise a temperature of the thermal medium liquid when the state of charge of the electrical storage device is the predetermined value or more upon regenerative braking, and thus prevention of overcharge by the electrical storage device and effective use of thermal energy are achieved.

However, in the case of the vehicle equipped with an electric motor in the related art, upon regenerative braking, since the thermal medium liquid normally flows through a substantially uniform flow path regardless of an operation condition or the like of the vehicle, it is difficult to rapidly change a heat receiving capacity by the thermal medium liquid according to an operation condition of the vehicle and to efficiently absorb heat of the temperature raising device with the thermal medium liquid.

An aspect of the present invention is directed to providing a vehicle equipped with an electric motor capable of efficiently consuming regenerative electric power as heat according to an operation condition of the vehicle and effectively using the heat when a state of charge of an electrical storage device is a predetermined value or more.

(1) A vehicle equipped with an electric motor according to an aspect of the present invention includes an electric motor configured to perform a regenerative braking; an electrical storage device electrically connected to the electric motor; an air-conditioning device configured to perform air conditioning in a passenger compartment of the vehicle; a heat source cooling circuit configured to cool a heat source by causing a thermal medium liquid to flow therethrough; and a controller configured to control at least the electric motor, the electrical storage device, the air-conditioning device, and the heat source cooling circuit, wherein the air-conditioning device includes a heater core configured to perform a heat exchange with a conditioning air, an air conditioning hot liquid circuit configured to cause a thermal medium liquid to flow through the heater core, and an electric power consumption type temperature raising device configured to raise a temperature of the thermal medium liquid flowing through the heater core, and in a case in which the regenerative braking is performed by the electric motor when a state of charge of the electrical storage device is a predetermined value or more, the controller raises the temperature of the thermal medium liquid passing through the heater core by using the temperature raising device and switches a connection and a shutting between the air conditioning hot liquid circuit and the heat source cooling circuit according to each of a temperature of the thermal medium liquids inside the air conditioning hot liquid circuit.

According to the above mentioned configuration of (1), when regenerative braking is performed by the electric motor if a state of charge of the electrical storage device is a predetermined value or more, the temperature raising device raises a temperature of the thermal medium liquid in the air conditioning hot liquid circuit. Here, electric power of the electrical storage device is consumed by the temperature raising device. In addition, while the thermal medium liquid in the air conditioning hot liquid circuit circulates through substantially only the inside of the air conditioning hot liquid circuit when the air conditioning hot liquid circuit is disconnected from the heat source cooling circuit, on the other hand, when the air conditioning hot liquid circuit is connected to the heat source cooling circuit, the thermal medium liquid circulates in a combined route of the air conditioning hot liquid circuit and the heat source cooling circuit. For this reason, since connection and shutting of the circuits are performed according to the temperature of the thermal medium liquid in the air conditioning hot liquid circuit and the heat source cooling circuit, a heat receiving capacity can be rapidly varied by the thermal medium liquid.

(2) In the aspect of above mentioned (1), the heat source cooling circuit may include a heat exchanger configured to perform a heat exchange with outside air, and a thermal medium liquid may flow through the heat exchanger when a temperature of the thermal medium liquid located at downstream from the heat source is a first predetermined temperature or higher.

In this case, in a case regenerative braking is performed by the electric motor when a state of charge of the electrical storage device is a predetermined value or more, when the temperature raising device is operated at this time and the air conditioning hot liquid circuit is connected to the heat source cooling circuit, a temperature of the thermal medium liquid flowing through the air conditioning hot liquid circuit and the heat source cooling circuit is gradually increased. The thermal medium liquid does not flow into the heat exchanger in the heat source cooling circuit until the temperature of the thermal medium liquid located at downstream from the heat source reaches a first predetermined temperature. When the temperature of the thermal medium liquid downstream from the heat source reaches the first predetermined temperature or higher from this state, the thermal medium liquid flows into the heat exchanger, and heat of the thermal medium liquid is radiated to the outside air by the heat exchanger. Accordingly, when this configuration is employed, electric power consumption in the temperature raising device upon regenerative braking can be continued for a long time while minimizing an excessive increase in temperature of the thermal medium liquid.

(3) In the aspect of above mentioned (1) or (2), the controller may connect the air conditioning hot liquid circuit to the heat source cooling circuit when the temperature of the thermal medium liquid inside the air conditioning hot liquid circuit is higher than the temperature of the thermal medium liquid inside the heat source cooling circuit.

In this case, since the thermal medium liquid in the heat source cooling circuit having a relatively low temperature flows into the air conditioning hot liquid circuit, heat generated from the temperature raising device can be efficiently absorbed by the thermal medium liquid inside of the air conditioning hot liquid circuit. Accordingly, when this configuration is employed, the heat corresponding to the electric power consumption in the temperature raising device can be efficiently absorbed by the thermal medium liquid, and the heat can be effectively used by a heating operation or the like of the air-conditioning device.

(4) In the aspect of above mentioned (3), when there is no heating requirement, regardless of the temperature of the thermal medium liquid in the air conditioning hot liquid circuit, the controller may connect the air conditioning hot liquid circuit to the heat source cooling circuit when the temperature of the thermal medium liquid in the air conditioning hot liquid circuit is higher than the temperature of the thermal medium liquid in the heat source cooling circuit.

When the air conditioning hot liquid circuit is connected to the heat source cooling circuit when the temperature of the thermal medium liquid in the air conditioning hot liquid circuit is higher than the temperature of the thermal medium liquid in the heat source cooling circuit, heat may escape from the air conditioning hot liquid circuit to the heat source cooling circuit and the temperature of the heater core may be temporarily lowered. However, when there is no heating requirement, since an occupant does not particularly want to raise the temperature in the passenger compartment, comfortability of the occupant is not decreased even if the temperature of the heater core is temporarily lowered. Accordingly, when this configuration is employed, active electric power consumption (waste electric power regeneration) can be performed upon regenerative braking without sacrificing comfortability of the occupant in the passenger compartment.

(5) In the aspect of above mentioned (3) or (4), in a case in which there is a heating requirement, the controller may connect the air conditioning hot liquid circuit to the heat source cooling circuit only when the temperature of the thermal medium liquid in the air conditioning hot liquid circuit is a second predetermined temperature or higher.

When the air conditioning hot liquid circuit is connected to the heat source cooling circuit when the temperature of the thermal medium liquid in the air conditioning hot liquid circuit is higher than the temperature of the thermal medium liquid in the heat source cooling circuit, heat may escape from the air conditioning hot liquid circuit to the heat source cooling circuit and the temperature of the heater core can be temporarily lowered. Then, if such condition occurs when there is a heating requirement, the conditioning air which has heat-exchanged with the heater core is blown into the passenger compartment, and there is a possibility of giving discomfort (a feeling of cold air) to the occupant in the passenger compartment. However, when there is a heating requirement in the aspect, since the air conditioning hot liquid circuit is connected to the heat source cooling circuit only when the temperature of the thermal medium liquid in the air conditioning hot liquid circuit is the certain temperature (the second predetermined temperature) or more, even though the conditioning air which has heat-exchanged with the heater core is blown into the passenger compartment, a possibility of giving discomfort to the occupant (a feeling of cold air for the occupant) is lowered. Accordingly, when the configuration is employed, even when there is a heating requirement, active electric power consumption (waste electric power regeneration) can be performed upon regenerative braking without sacrificing comfortability of the occupant in the passenger compartment.

(6) In the aspect of above mentioned (5), the second predetermined temperature may be set according to an air conditioning demand medium liquid temperature of the heater core.

(7) In the aspect of above mentioned (6), the air conditioning demand medium liquid temperature may be set according to at least an air conditioning set temperature set by an occupant.

In this case, since the second predetermined temperature is set according to the air conditioning set temperature or the like adjusted by the occupant, when the temperature of the thermal medium liquid in the air conditioning hot liquid circuit is the second predetermined temperature or higher, even if the conditioning air which has heat-exchanged with the heater core is blown into the passenger compartment, a possibility of giving discomfort to the occupant from cold air is lowered.

According to the aspect of the present invention, in the case in which regenerative braking is performed by the electric motor when a state of charge of the electrical storage device is the predetermined value or more, since the controller performs an increase in temperature of the thermal medium liquid using the temperature raising device and performs connection and shutting between the air conditioning hot liquid circuit and the heat source cooling circuit according to the temperature of the thermal medium liquid in the air conditioning hot liquid circuit and the heat source cooling circuit, a heat receiving capacity by the thermal medium liquid can be rapidly varied according to an operation condition of the vehicle. Accordingly, according to the present invention, when a state of charge of the electrical storage device is a predetermined value or more, regenerative electric power can be efficiently consumed as heat according to an operation condition of the vehicle, and the heat can be effectively used.

DETAILED DESCRIPTION OF THE INVENTION

Hereinafter, embodiments of the present invention will be described with reference to the accompanying drawings.

First, a first embodiment shown in FIG. 1 to FIG. 4 will be described.

A vehicle equipped with an electric motor (hereinafter referred to as "a vehicle 1") according to the embodiment is a hybrid vehicle such as a plug-in hybrid vehicle or the like in which an engine E (an internal combustion engine) and an electric motor 17 serving as driving sources are mounted.

Figure 1:
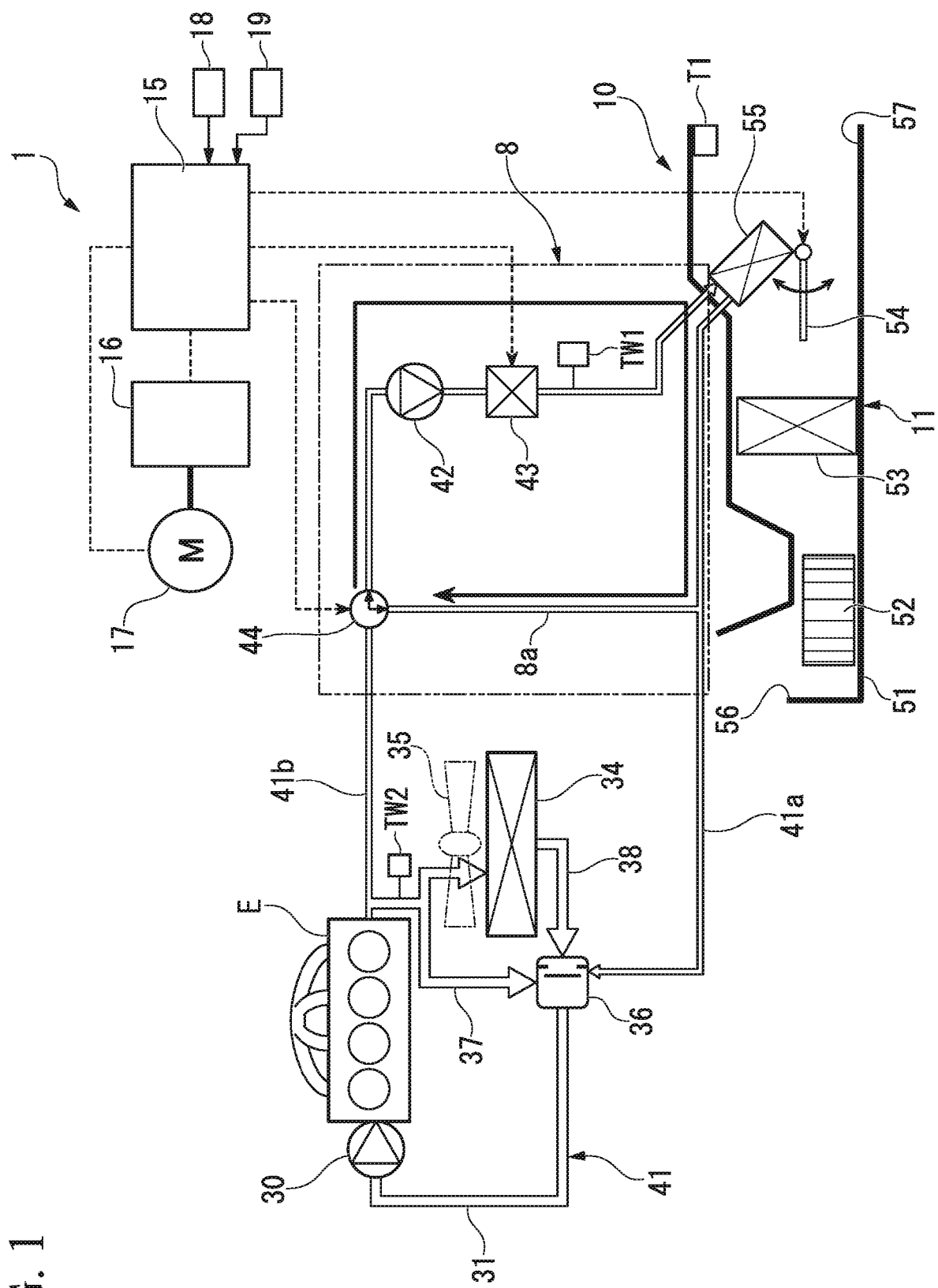
FIG. 1 is a schematic configuration view of a vehicle equipped with an electric motor according to a first embodiment of the present invention.

FIG. 1 is a view showing a schematic configuration of the vehicle 1.

As shown in FIG. 1, the vehicle 1 includes the engine E and the electric motor 17 that are configured to drive the vehicle, an electrical storage device 16 (a secondary battery) that is chargeable, an air-conditioning device 10 configured to perform air conditioning in a passenger compartment, an engine cooling circuit 41 (a heat source cooling circuit) configured to cool the engine E that is a heat source, and a controller 15 configured to control them.

The electric motor 17 is electrically connected to the electrical storage device 16 via an inverter (not shown). When the electric motor 17 is driven, direct current output from the electrical storage device 16 is converted into alternating current by the inverter to be supplied to the electric motor 17. When the alternating current is supplied to the electric motor 17, the electric motor 17 generates a driving force. The vehicle is driven by receiving the driving force of the electric motor 17.

Meanwhile, when the vehicle 1 is driven, the electric motor 17 functions as a generator. That is, rotation of a driving wheel is transmitted to an output shaft of the electric motor 17, and electric power is regenerated by the electric motor 17 due to rotation of the output shaft. Here, the electric motor 17 becomes a resistance, and the resistance is applied to the vehicle 1 as a regenerative braking force. Alternating current regenerated by the electric motor 17 is converted into direct current by the inverter. The converted direct current is supplied from the inverter to the electrical storage device 16 and stored in the electrical storage device 16.

The engine E is appropriately switched to the electric motor 17 or driven together with the electric motor 17 according to control by the controller 15. The vehicle 1 can also be driven by power of the engine E.

In addition, the air-conditioning device 10 includes an air-conditioning unit 11, a coolant circuit for cooling (not shown), and an air conditioning hot liquid circuit 8 for heating.

The air-conditioning unit 11 includes an air-conditioning duct 51 through which conditioning air flows, a blower 52 accommodated in the air-conditioning duct 51, an evaporator 53, an air-mix door 54, and a heater core 55.

The air-conditioning duct 51 has an air intake port 56 and an air outlet port 57. The blower 52, the evaporator 53, the air-mix door 54 and the heater core 55 are sequentially disposed from an upstream side (the air intake port 56 side) toward a downstream side (the air outlet port 57 side) in a flow direction of the conditioning air in the air-conditioning duct 51.

In addition, a temperature sensor T1 configured to detect a blowing temperature of the conditioning air into the passenger compartment is installed in the air outlet port 57 of the air-conditioning duct 51. Temperature information detected by the temperature sensor T1 is input to the controller 15 and used for control of parts using the controller 15.

In the blower 52, a voltage applied to a driving motor is controlled by the controller 15. The blower 52 adjusts an air volume under control of the driving motor by the controller 15. The blower 52 delivers the conditioning air taken into the air-conditioning duct 51 from the air intake port 56 toward a downstream side, i.e., toward the evaporator 53 and the heater core 55.

The evaporator 53 is a heat exchanger installed in a coolant circuit for cooling (not shown), performs heat exchange between a low temperature and low pressure coolant flowing thereinto and the conditioning air in the air-conditioning duct 51, and for example, cools the conditioning air passing through the evaporator 53 through heat absorption when the coolant is evaporated.

For example, the air-mix door 54 is pivoted under control by the controller 15.

The air-mix door 54 pivots between a heating position at which a ventilation route is opened toward the heater core 55 from a downstream side of the evaporator 53 in the air-conditioning duct 51 and a cooling position at which a ventilation route is opened so as to bypass the heater core 55. Accordingly, among the conditioning air passing through the evaporator 53, a ratio between an air volume of the conditioning air passing through the heater core 55 and an air volume of the conditioning air bypassing the heater core 55 is adjusted.

In addition, the air conditioning hot liquid circuit 8 for heating is connected to the engine cooling circuit 41 via a flow path switching valve 44 such as a 3-way valve or the like. The air conditioning hot liquid circuit 8 and the engine cooling circuit 41 are filled with a thermal medium liquid (cooling water) such as ethylene glycol or the like.

The air conditioning hot liquid circuit 8 has an electrically operated pump 42 configured to deliver a thermal medium liquid, an electric heater 43 configured to increase a temperature of the thermal medium liquid downstream from the pump 42, and the heater core 55 configured to perform heat exchange between the thermal medium liquid having the temperature increased by the electric heater 43 and the conditioning air in the air-conditioning duct 51.

In the embodiment, the electric heater 43 constitutes an electric power consumption type temperature raising device configured to increase a temperature of a thermal medium liquid.

In addition, a liquid temperature sensor TW1 configured to detect a temperature of the thermal medium liquid of the inlet portion of the heater core 55 is installed on the inlet portion of the heater core 55 of the air conditioning hot liquid circuit 8.

The engine cooling circuit 41 has a pump 30 configured to deliver a thermal medium liquid toward the engine E, and a return passage 31 configured to return the thermal medium liquid passing through the engine E toward a suction side of the pump 30. A portion of the return passage 31 close to the outflow port of the engine E is branched off into a main passage 37 and a bypass passage 38, and a radiator 34 (a heat exchanger) configured to perform heat exchange with the outside air is installed in the bypass passage 38. A cooling fan 35 controlled to be driven by the controller 15 is installed on the radiator 34. A thermostat 36 configured to open and close the bypass passage 38 according to a temperature of the thermal medium liquid is installed in a joining section downstream from the main passage 37 and the bypass passage 38. The thermostat 36 closes the bypass passage 38 when a temperature of the thermal medium liquid passing through the main passage 37 is lower than a predetermined temperature (a first predetermined temperature), and opens the bypass passage 38 when the temperature of the thermal medium liquid is the predetermined temperature (the first predetermined temperature) or more. Accordingly, when the temperature of the thermal medium liquid is the predetermined temperature (the first predetermined temperature) or more, heat of the thermal medium liquid is radiated in the radiator 34.

A liquid temperature sensor TW2 configured to detect a temperature of a thermal medium liquid of an outflow port portion of the engine E is installed on the outflow port portion of the engine E of the engine cooling circuit 41. Liquid temperature information detected by the liquid temperature sensor TW1 and liquid temperature information detected by the liquid temperature sensor TW2 are input to the controller 15, and used for control of the parts using the controller 15.

A portion of the engine cooling circuit 41 upstream from the pump 30 is connected to a portion of the air conditioning hot liquid circuit 8 downstream from the heater core 55 via a connecting passage 41a. In addition, the outflow port portion of the engine E of the engine cooling circuit 41 is connected to a portion of the air conditioning hot liquid circuit 8 upstream from the pump 42 via a connecting passage 41b. The connecting passage 41a of one side is connected to an outlet portion of the heater core 55 with a return passage 8a of the air conditioning hot liquid circuit 8 in the drawing sandwiched therebetween, and the connecting passage 41b of the other side is connected to a suction section of the pump 42 with the return passage 8a of the air conditioning hot liquid circuit 8 in the drawing sandwiched therebetween. In other words, the connecting passages 41a and 41b are connected to an upstream section and a downstream section of the return passage 8a of the air conditioning hot liquid circuit 8, respectively. The flow path switching valve 44 is disposed on a joining connecting section between the downstream section of the return passage 8a and the connecting passage 41b.

In FIG. 1, the flow path switching valve 44 shuts a space between the air conditioning hot liquid circuit 8 and the engine cooling circuit 41.

When the air conditioning hot liquid circuit 8 and the engine cooling circuit 41 are shut by the flow path switching valve 44, the thermal medium liquid discharged from the pump 42 is returned to the pump 42 from the return passage 8a through the electric heater 43 and the heater core 55 in sequence as shown by an arrow in FIG. 1. That is, the thermal medium liquid ejected by the pump 42 circulates through the air conditioning hot liquid circuit 8 only. Accordingly, here, when the electric heater 43 is operated, heat of the electric heater 43 is absorbed by only the thermal medium liquid in the air conditioning hot liquid circuit 8.

Figure 3:
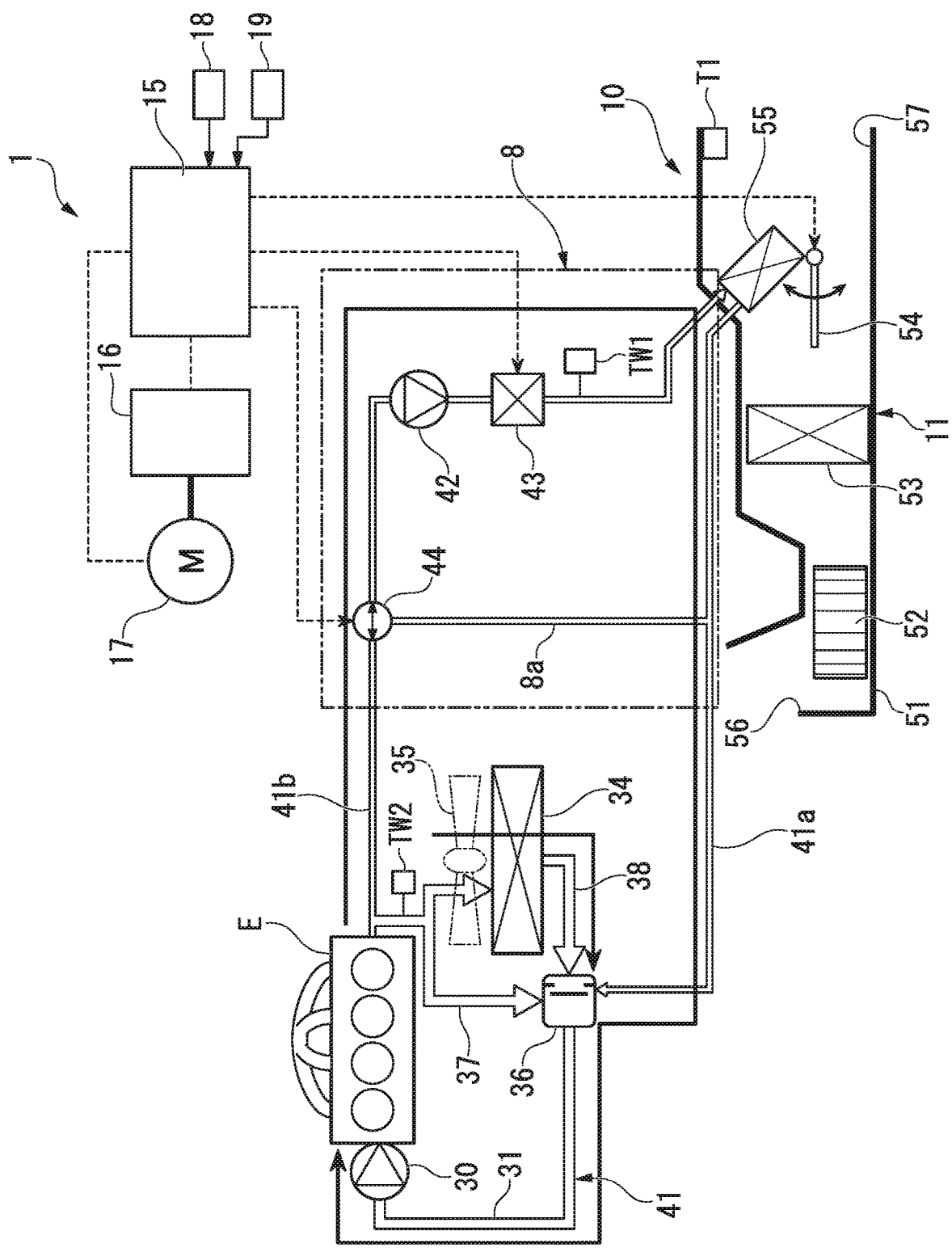
FIG. 3 is a schematic configuration view of the vehicle equipped with an electric motor according to the first embodiment of the present invention.

FIG. 3 is a view showing a schematic configuration of the same vehicle 1 as in FIG. 1. In FIG. 3, the flow path switching valve 44 connects the air conditioning hot liquid circuit 8 and the engine cooling circuit 41.

When the air conditioning hot liquid circuit 8 and the engine cooling circuit 41 are connected by the flow path switching valve 44, the thermal medium liquid ejected from the pump 42 enters the engine cooling circuit 41 through the connecting passage 41a after passing through the electric heater 43 and the heater core 55 in sequence, and is returned to the pump 42 of the air conditioning hot liquid circuit 8 through the connecting passage 41b, as shown by an arrow in FIG. 3. That is, the thermal medium liquid circulates through the air conditioning hot liquid circuit 8 and the engine cooling circuit 41. Accordingly, here, when the electric heater 43 is operated, heat of the electric heater 43 increases a temperature of the thermal medium liquid in the air conditioning hot liquid circuit 8 and the engine cooling circuit 41. Here, heat of the electric heater 43 is absorbed by the thermal medium liquid in the air conditioning hot liquid circuit 8 and the engine cooling circuit 41.

In addition, when the temperature of the thermal medium liquid in the engine cooling circuit 41 is a predetermined temperature or higher, the thermostat 36 opens the bypass passage 38 and some of the thermal medium liquid passes through the radiator 34. Here, some of the heat of the thermal medium liquid is radiated to the outside air by the radiator 34. As a result, heat absorption of the electric heater 43 by the thermal medium liquid for a long time becomes possible.

The controller 15 controls the electric motor 17 and the electrical storage device 16 according to a driving operation or a traveling condition. Information of a state of charge (SOC) of the electrical storage device 16, information of regenerative power generation by the electric motor 17, or the like, is input to the controller 15. The controller 15 further performs control for preventing overcharging of the electrical storage device 16 upon regenerative braking by the electric motor 17 on the basis of input information thereof, operation information of various kinds of air-conditioning switches (for example, a main switch 18 or a temperature adjusting switch 19 of the air-conditioning device), detection information of the temperature sensor T1 or the liquid temperature sensors TW1 and TW2, and so on.

The controller 15 receives information of the state of charge of the electrical storage device 16 and information of the regenerative power generation by the electric motor 17, and performs an operation of the air-conditioning device 10 for actively consuming electric power of the electrical storage device 16 (hereinafter, the operation is referred to as "active electric power consuming operation") when it is determined that regenerative braking (regenerative power generation) by the electric motor 17 is performed (hereinafter, referred to as "overcharge regeneration") in a state in which the state of charge of the electrical storage device 16 is the predetermined value or more.

In addition, the controller 15 determines whether the temperature of the thermal medium liquid in the air conditioning hot liquid circuit 8 is higher than the temperature of the thermal medium liquid in the engine cooling circuit 41 (the heat source cooling circuit) on the basis of the detection information of the liquid temperature sensors TW1 and TW2. The controller 15 opens the flow path switching valve 44 and connects the air conditioning hot liquid circuit 8 to the engine cooling circuit 41 when the temperature of the thermal medium liquid in the air conditioning hot liquid circuit 8 is higher than the temperature of the thermal medium liquid in the engine cooling circuit 41 (hereinafter, this condition is referred to as "when a relative temperature in the air conditioning hot liquid circuit 8 is high"). In addition, the controller 15 closes the flow path switching valve 44 and blocks the air conditioning hot liquid circuit 8 with respect to the engine cooling circuit 41 when the temperature of the thermal medium liquid in the air conditioning hot liquid circuit 8 is not higher than the temperature of the thermal medium liquid in the engine cooling circuit 41 (hereinafter, this condition is referred to as "when a relative temperature in the air conditioning hot liquid circuit 8 is low").

Figure 2:
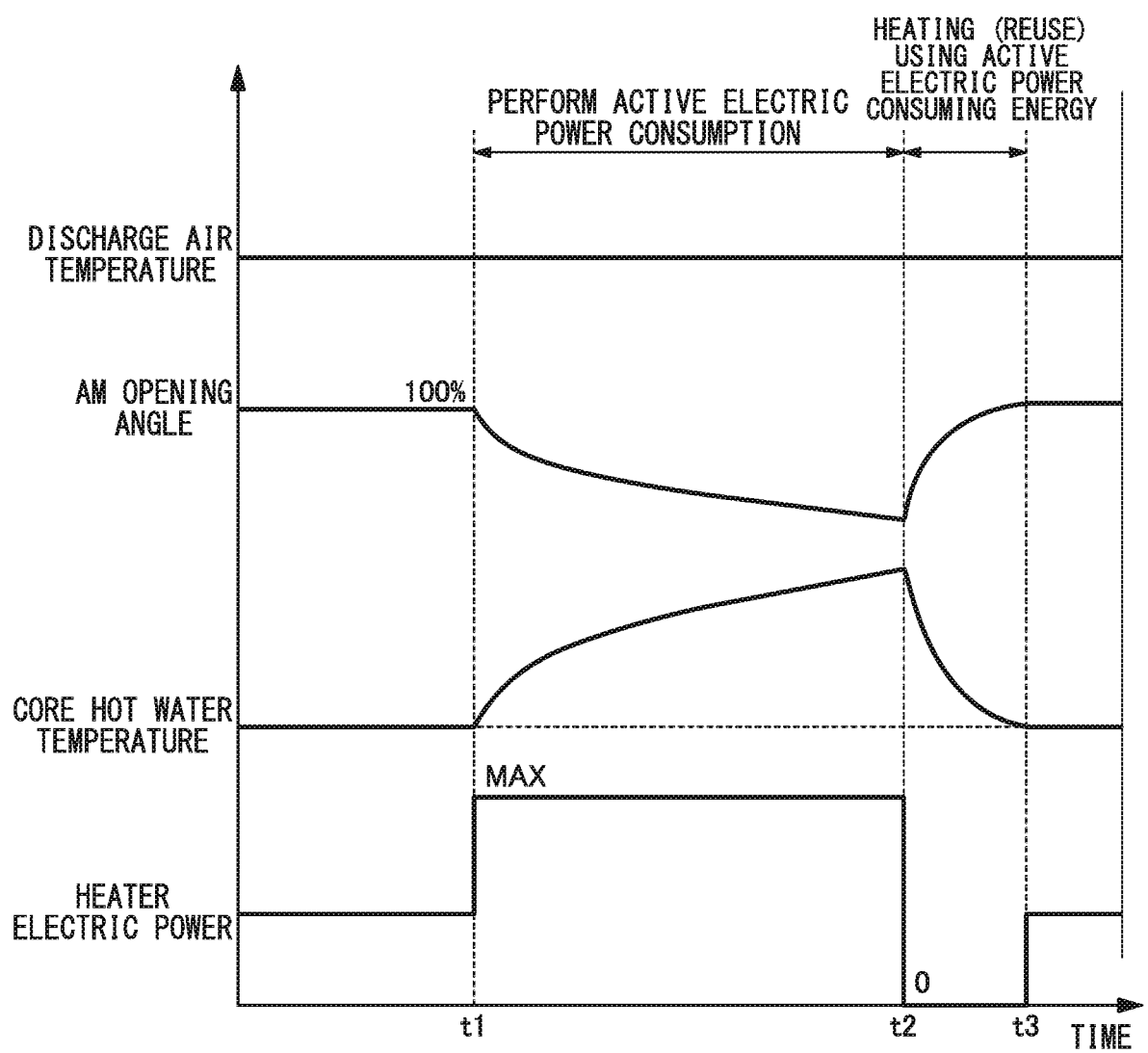
FIG. 2 is a timing chart for explaining states of parts of the vehicle equipped with an electric motor according to the first embodiment of the present invention.

FIG. 2 is a timing chart showing an aspect of variations of a blowing temperature (a discharge air temperature) of the air-conditioning device 10 when the regenerative braking is performed upon traveling of the vehicle 1, an opening angle of the air-mix door 54 (an AM opening angle), a temperature of the thermal medium liquid of an inlet side of the heater core 55 (a core hot water temperature), and electric power consumption of the electric heater 43 (heater electric power). FIG. 2 is a timing chart when a relative temperature in the air conditioning hot liquid circuit 8 is low and the air conditioning hot liquid circuit 8 and the engine cooling circuit 41 are in a shut state.

Hereinafter, control by the controller 15 when the relative temperature in the air conditioning hot liquid circuit 8 is low will be described with reference to FIG. 2.

A time to t1 in FIG. 2 is a state of the parts of the air-conditioning device 10 when a normal heating operation is performed. Here, the electric heater 43 in the air conditioning hot liquid circuit 8 is operated with a predetermined output, and an inlet temperature of the heater core 55 is in a predetermined temperature state. In addition, the air-mix door 54 maximally opens the passage toward the heater core 55 in the air-conditioning duct 51, and a blowing temperature in the passenger compartment is held at a substantially constant temperature.

In the time t1 in FIG. 2, it is determined that the controller 15 is a status of overcharge regeneration upon regenerative braking, and the electric heater 43 in the air conditioning hot liquid circuit 8 is operated with a maximum output. Here, consumption of the electric power of the electrical storage device 16 by the electric heater 43 is increased. When output of the electric heater 43 is increased in this way, heat radiation to the thermal medium liquid from the electric heater 43 is increased, and as a result, a liquid temperature of the thermal medium liquid of the inlet of the heater core 55 is gradually increased. Here, if an opening angle of the air-mix door 54 in the air-conditioning duct 51 is maximized, since the temperature of the conditioning air blown into the passenger compartment is increased, the controller 15 gradually narrows an opening angle of the air-mix door 54 such that the blowing temperature of the conditioning air is constant. A state from t1 to t2 in FIG. 2 is this state.

In a time t2 in FIG. 2, a status of the overcharge regeneration is terminated. Here, the controller 15 completely stops an operation of the electric heater 43. As a result, while a liquid temperature of the thermal medium liquid in the air conditioning hot liquid circuit 8 (a liquid temperature of the inlet of the heater core 55) is gradually decreased, here, an opening angle of the air-mix door 54 is gradually opened such that the blowing temperature of the conditioning air is constant. A state from t2 to t3 in FIG. 2 is this state. In a duration from t2 to t3, a heating operation is performed using thermal energy (active electric power consuming energy) stored in the thermal medium liquid in the air conditioning hot liquid circuit 8.

In a time t3 in FIG. 2, the controller 15 returns to a normal heating operation.

Figure 4:
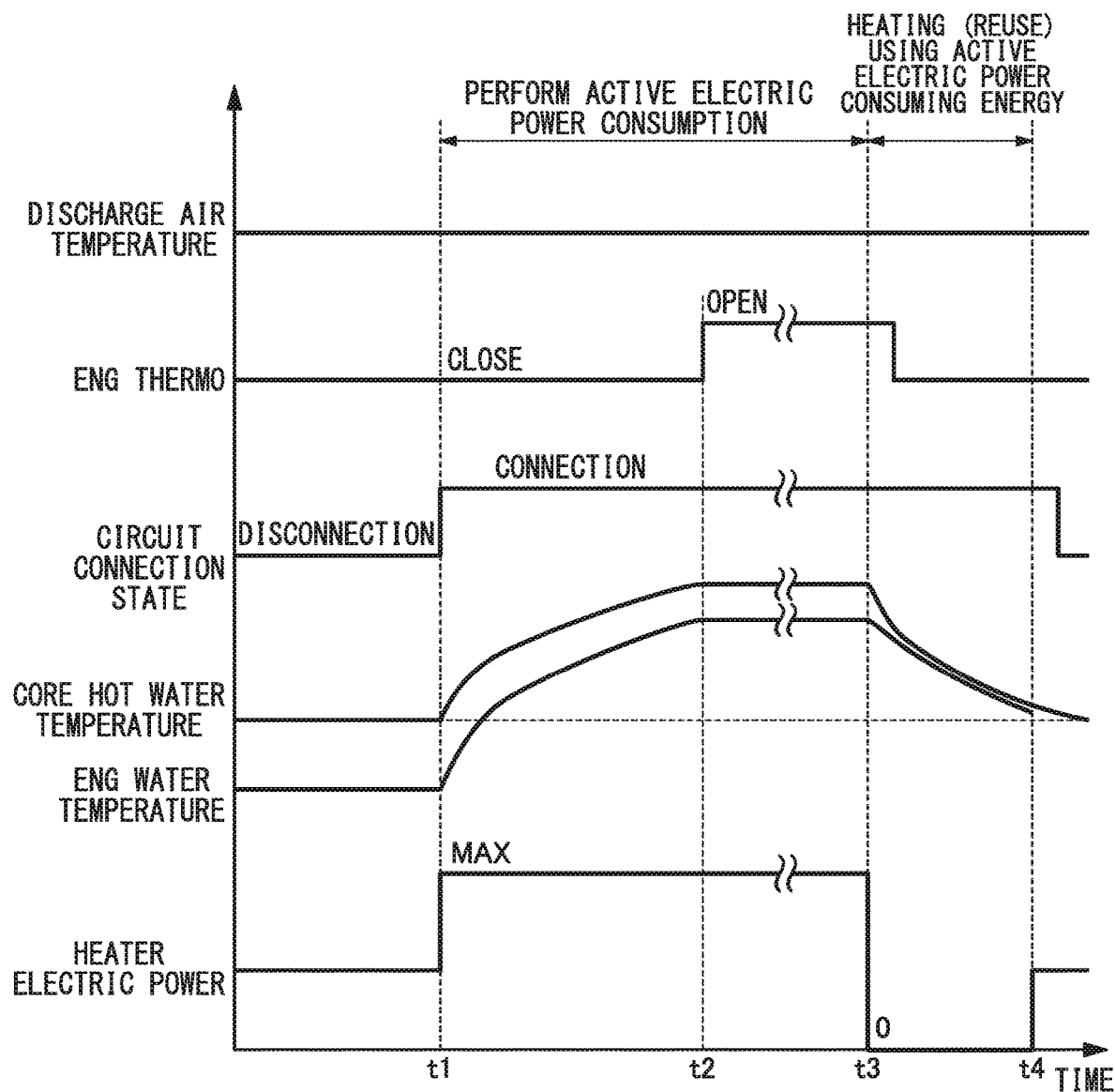
FIG. 4 is a timing chart for explaining states of the parts of the vehicle equipped with an electric motor according to the first embodiment of the present invention.

FIG. 4 is a timing chart showing aspects of various variations of a blowing temperature (a discharge air temperature) of the air-conditioning device 10, an opening and closing state (ENG thermo) of the thermostat 36 in the engine cooling circuit 41, a connection state (a circuit state) between the air conditioning hot liquid circuit 8 and the engine cooling circuit 41, a liquid temperature (a core hot water temperature) of a thermal medium liquid of an inlet side of the heater core 55, a liquid temperature (an ENG water temperature) of a thermal medium liquid on a side of an outflow port of the engine E, and electric power consumption (heater electric power) of the electric heater 43, when regenerative braking is performed upon traveling of the vehicle 1. FIG. 4 is a timing chart when a relative temperature in the air conditioning hot liquid circuit 8 is high. Further, in FIG. 4, while the opening and closing state of the air-mix door 54 is omitted, an opening angle of the air-mix door 54 is appropriately controlled such that a blowing temperature in the passenger compartment is constantly held.

A time to t1 of FIG. 4 is states of parts of the air-conditioning device 10 when a normal heating operation is performed. Here, the electric heater 43 in the air conditioning hot liquid circuit 8 is operated with a predetermined output, and an inlet temperature of the heater core 55 is in a predetermined temperature state. In the meantime, the air-mix door 54 is maximally opened, and the blowing temperature in the passenger compartment is held at a substantially constant temperature.

In the time t1 of FIG. 4, it is determined that the controller 15 is in a condition of overcharge regeneration upon regenerative braking, and the electric heater 43 in the air conditioning hot liquid circuit 8 is operated with a maximum output. In addition, the controller 15 controls the flow path switching valve 44, and the air conditioning hot liquid circuit 8 and the engine cooling circuit 41 are in a connection state. Here, consumption of electric power of the electrical storage device 16 by the electric heater 43 is increased. In addition, here, heat of the electric heater 43 is absorbed by the thermal medium liquid in the air conditioning hot liquid circuit 8 and the engine cooling circuit 41.

Even in this case, when the regenerative braking is continued, heat radiation from the electric heater 43 to the thermal medium liquid is increased, and a liquid temperature of the thermal medium liquid in the air conditioning hot liquid circuit 8 and the engine cooling circuit 41 is gradually increased.

In the time t2 of FIG. 4, the liquid temperature of the thermal medium liquid flowing through the engine cooling circuit 41 is higher than the predetermined liquid temperature and the thermostat 36 opens the bypass passage 38. Here, some of the thermal medium liquid is introduced into the radiator 34, and heat of the thermal medium liquid is radiated to the outside air. Accordingly, even when overcharge regeneration is continued for a long time, in the meantime, consumption of the electric power by the electric heater 43 can be continued.

In the time t3 of FIG. 4, a condition of overcharge regeneration is terminated. Here, the controller 15 completely stops an operation of the electric heater 43. As a result, a liquid temperature of the thermal medium liquid in the air conditioning hot liquid circuit 8 and the engine cooling circuit 41 is gradually decreased. After that, the controller 15 returns to the normal heating operation when it becomes t4 in FIG. 4, heating is performed by heat accumulated in the thermal medium liquid in the air conditioning hot liquid circuit 8 from t3 to t4. In the meantime, an opening angle of the air-mix door 54 is controlled by the controller 15 such that the blowing temperature is constantly held. After that, the air conditioning hot liquid circuit 8 is in a state shut with respect to the engine cooling circuit 41.

Incidentally, in the vehicle 1 of the embodiment, the controller 15 performs different control in the case in which the controller is operated in a mode except the heating operation mode (when there is no heating requirement) and the case in which the controller is operated in the heating operation mode (when heating requirement is provided), when it is determined that the condition is the overcharge regeneration condition upon regenerative braking.

That is, when the controller is operated in a mode expect the heating operation mode (when there is no heating requirement), if the temperature of the thermal medium liquid in the air conditioning hot liquid circuit 8 is higher than the thermal medium temperature in the engine cooling circuit 41, regardless of the temperature of the thermal medium liquid in the air conditioning hot liquid circuit 8, the air conditioning hot liquid circuit 8 and the engine cooling circuit 41 are in a connection state by the flow path switching valve 44.

Meanwhile, when the controller is operated in the heating operation mode (when heating requirement is provided), only when the temperature of the thermal medium liquid in the air conditioning hot liquid circuit 8 is higher than the thermal medium temperature in the engine cooling circuit 41 and the liquid temperature of the thermal medium liquid in the air conditioning hot liquid circuit 8 is a predetermined temperature (a second predetermined temperature) or more, the air conditioning hot liquid circuit 8 and the engine cooling circuit 41 are in a connection state by the flow path switching valve 44. Accordingly, the thermal medium liquid in the engine cooling circuit 41 flows into the air conditioning hot liquid circuit 8 and a temperature of the heater core 55 is temporarily decreased, and thus, a temperature of heated air can be prevented from being abruptly decreased.

Further, the temperature of the thermal medium liquid in the air conditioning hot liquid circuit 8 (hereinafter, referred to as "a second predetermined temperature") when connection between the air conditioning hot liquid circuit 8 and the engine cooling circuit 41 is allowed is determined by an air conditioning demand medium temperature of the thermal medium liquid in the heater core required form the heating operation. The air conditioning demand medium temperature is determined according to the air conditioning set temperature operated and set by at least an occupant.

As described above, in the vehicle 1 of the embodiment, upon overcharge regeneration, the controller 15 performs raising of a temperature of the thermal medium liquid by the electric heater 43, and performs connection and shutting of air conditioning hot liquid circuit 8 and the engine cooling circuit 41 according to the temperature of the thermal medium liquid in the air conditioning hot liquid circuit 8 and the engine cooling circuit 41. For this reason, a heat receiving capacity due to the thermal medium liquid can be rapidly varied according to the operation condition of the vehicle. Accordingly, when the vehicle of the embodiment is employed, upon overcharge regeneration, regenerative electric power can be efficiently consumed as heat according to the operation condition of the vehicle, and simultaneously, the heat can be effectively used as heating heat.

In addition, the vehicle 1 of the embodiment has a configuration in which the engine cooling circuit 41 includes the radiator 34 and some of the thermal medium liquid flows into the radiator 34 when the temperature of the thermal medium liquid on the side of the outflow port of the engine E is a predetermined temperature (a first predetermined temperature) or more. For this reason, electric power consumption by the electric heater 43 upon overcharge regeneration can be continued throughout a long time while minimizing an excessive increase in temperature of the thermal medium liquid.

In particular, in the vehicle 1 of the embodiment, upon overcharge regeneration, when the temperature of the thermal medium liquid in the air conditioning hot liquid circuit 8 is higher than the temperature of the thermal medium liquid in the engine cooling circuit 41, the controller 15 performs control such that the air conditioning hot liquid circuit 8 is connected to the engine cooling circuit 41. For this reason, upon overcharge regeneration, the thermal medium liquid in the engine cooling circuit 41 having a relatively low temperature flows into the air conditioning hot liquid circuit 8. Accordingly, when the configuration is employed, heat of the electric heater 43 can be efficiently absorbed by the thermal medium liquid (heat can be efficiently accumulated in the thermal medium liquid). Accordingly, when the configuration is employed, heat of an electric power consumption extent by the electric heater 43 can be efficiently absorbed by the thermal medium liquid, and the heat can be effectively used as heating heat.

Further, in the vehicle 1 of the embodiment, when the controller is operated in a mode except the heating operation mode (when there is no heating requirement), if the temperature of the thermal medium liquid in the air conditioning hot liquid circuit 8 is higher than the temperature of the thermal medium in the engine cooling circuit 41, regardless of the temperature of the thermal medium liquid in the air conditioning hot liquid circuit 8, the air conditioning hot liquid circuit 8 and the engine cooling circuit 41 are in a connection state. In this case, while heat may escape from the air conditioning hot liquid circuit 8 to the engine cooling circuit 41 and a temperature of the heater core 55 may be temporarily decreased, since an occupant does not want an increase in temperature of the passenger compartment when the controller is operated in a mode except the heating operation mode, there is no worry of giving an occupant comfortability due to cold air even when the temperature of the heater core 55 is temporarily decreased. Accordingly, active electric power consumption (waste electric power regeneration) can be performed upon overcharge regeneration without sacrificing comfortability of an occupant in the passenger compartment.

In addition, in the vehicle 1 of the embodiment, in the case in which the controller is operated in a heating operation mode (when there is heating requirement), only when the temperature of the thermal medium liquid in the air conditioning hot liquid circuit 8 is higher than the temperature of the thermal medium in the engine cooling circuit 41 and the liquid temperature of the thermal medium liquid in the air conditioning hot liquid circuit 8 is a predetermined temperature (a second predetermined temperature) or more, the air conditioning hot liquid circuit 8 and the engine cooling circuit 41 are in a connection state. For this reason, when the controller is operated in the heating operation mode, the air conditioning hot liquid circuit 8 is connected to the engine cooling circuit 41 only when the temperature of the thermal medium liquid in the air conditioning hot liquid circuit 8 is the temperature (the second predetermined temperature) or more. Accordingly, even when the conditioning air heat-exchanged with the heater core 55 is blown out into the passenger compartment, the possibility of giving discomfort to an occupant decreases. Accordingly, even in the case of the heating operation mode, active electric power consumption (waste electric power regeneration) can be performed upon overcharge regeneration without sacrificing comfortability of an occupant in the passenger compartment.

In addition, the second predetermined temperature at which connection between the air conditioning hot liquid circuit 8 and the engine cooling circuit 41 is allowed is determined according to an air conditioning demand medium temperature of the thermal medium liquid in the heater core 55 required for the heating operation, and the air conditioning demand medium temperature is determined according to the air conditioning set temperature due to at least an occupant. For this reason, when the temperature of the thermal medium liquid in the air conditioning hot liquid circuit 8 is the second predetermined temperature or higher, even though the conditioning air heat-exchange with the heater core 55 is blown out into the passenger compartment, the possibility of giving discomfort to an occupant as cold air is small.

Figure 5:
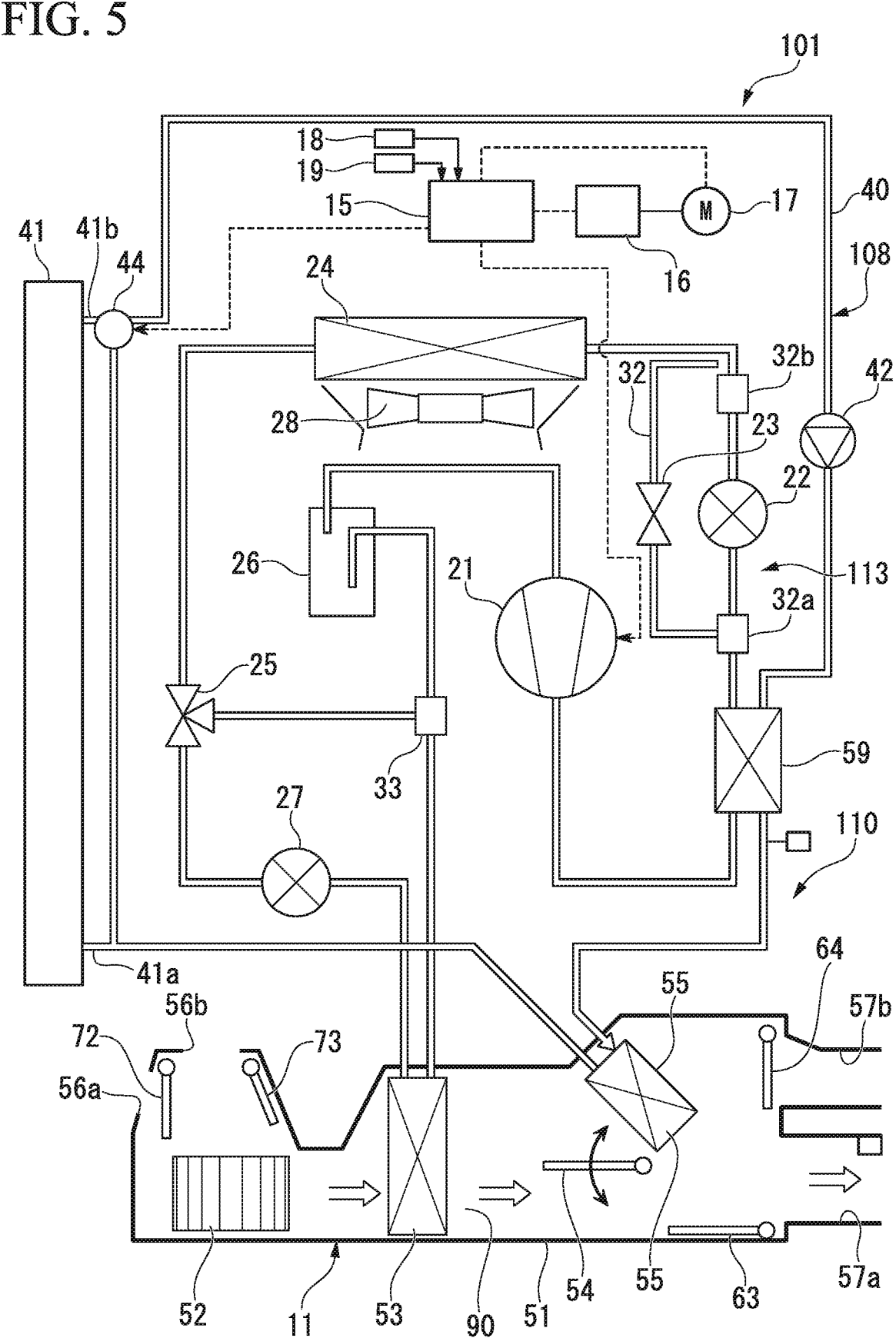
FIG. 5 is a schematic configuration view of a vehicle equipped with an electric motor according to a second embodiment of the present invention.

FIG. 5 is a view showing a schematic configuration of a vehicle equipped with an electric motor (hereinafter, referred to as "a vehicle 101") according to a second embodiment.

Like the first embodiment, the vehicle 101 of the embodiment is a hybrid vehicle in which the engine E (an internal combustion engine) and the electric motor 17 are mounted as driving sources. While the vehicle 101 of the embodiment is substantially the same basic configuration as the first embodiment, a configuration of an air-conditioning device 110 is different from the embodiment. Further, in the embodiment, common parts with the embodiment are designated by the same reference numerals.

The air-conditioning device 110 employed in the embodiment performs cooling and heating using a heat pump cycle. A coolant circuit 113 that constitutes the heat pump cycle includes a compressor 21, a condenser 59, an expansion valve 22 for heating, a bypass valve 23 for cooling, an outdoor heat exchanger 24, a 3-way valve 25, an expansion valve 27 for cooling, an evaporator 53 and a gas-liquid separator 26.

The compressor 21 is installed between the gas-liquid separator 26 and the condenser 59, and suctions a gaseous coolant on a side of the gas-liquid separator 26 and ejects the gaseous coolant toward the condenser 59. The expansion valve 22 for heating and the bypass valve 23 for cooling are disposed in parallel downstream from the condenser 59. The expansion valve 22 for heating decompressed and expands the coolant passing through the condenser 59, and then, ejects the coolant to the outdoor heat exchanger 24. The bypass valve 23 for cooling is installed on a bypass flow path 32 that bypasses the expansion valve 22 for heating while connecting a first branch section 32*a* and a second branch section 32*b* installed upstream and downstream from the expansion valve 22 for heating. The bypass valve 23 for cooling is in a closed state when a heating operation is performed, and is in an open state when a cooling operation is performed.

In the outdoor heat exchanger 24, when the heating operation is performed, a low temperature and low pressure coolant flowing thereinto absorbs heat from atmosphere outside the passenger compartment. Meanwhile, in the outdoor heat exchanger 24, when the cooling operation is performed, a high temperature and high pressure coolant flowing thereinto radiates heat to the atmosphere outside the passenger compartment.

The 3-way valve 25 switches and ejects the coolant discharged from the outdoor heat exchanger 24 to the gas-liquid separator 26 or the expansion valve 27 for cooling. The 3-way valve 25 is connected to the outdoor heat exchanger 24, a joining section 33 disposed on a side of the gas-liquid separator 26, and the expansion valve 27 for cooling, and for example, a flow direction of the coolant is switched according to control by the controller 15.

The 3-way valve 25 ejects the coolant discharged from the outdoor heat exchanger 24 toward the joining section 33 on the side of the gas-liquid separator 26 when the heating operation is performed. Meanwhile, when the cooling operation is performed, the 3-way valve 25 ejects the coolant discharged from the outdoor heat exchanger 24 toward the expansion valve 27 for cooling.

In addition, the gas-liquid separator 26 is installed between the joining section 33 and the compressor 21 in the coolant circuit 113, separates a gas and a liquid of the coolant that has flowed from the joining section 33, and suctions the gaseous coolant into the compressor 21.

In addition, the evaporator 53 is connected downstream from the expansion valve 27 for cooling. The evaporator 53 is installed between the expansion valve 27 for cooling and the joining section 33 (the gas-liquid separator 26).

When the air-conditioning device 110 is operated in the heating operation mode, the high temperature and high pressure coolant ejected from the compressor 21 flows into the condenser 59 and radiates heat in the condenser 59. The coolant passing through the condenser 59 is decompressed while passing through the expansion valve 22 for heating, and becomes a low temperature and a low pressure to flow into the outdoor heat exchanger 24. Here, heat is absorbed from the outdoor atmosphere by the outdoor heat exchanger 24. Then, the coolant passing through the outdoor heat exchanger 24 flows into the gas-liquid separator 26 through the 3-way valve 25. The gaseous coolant separated by the gas-liquid separator 26 is returned to the compressor 21.

Meanwhile, when the air-conditioning device 110 is operated in a cooling operation mode, the high temperature and high pressure coolant ejected from the compressor 21 flows into the outdoor heat exchanger 24 through the condenser 59 and the bypass valve 23 for cooling. Here, heat of the coolant is radiated to the outdoor atmosphere by the outdoor heat exchanger 24. The coolant passing through the outdoor heat exchanger 24 enters the expansion valve 27 for cooling through the 3-way valve 25, and flows into the evaporator 53 after being compressed by the expansion valve 27 for cooling. Here, the coolant passing through the evaporator 53 absorbs heat from the conditioning air in the air-conditioning duct 51. Then, the coolant passing through the evaporator 53 enters the gas-liquid separator 26, and a gas phase extent separated by the gas-liquid separator 26 is returned to the compressor 21.

In addition, a pipeline of an air conditioning hot liquid circuit 108 downstream from the pump 42 is inserted through the condenser 59 of the coolant circuit 113. In the condenser 59, heat exchange is performed between the coolant flowing therethrough and the thermal medium liquid flowing through the pipeline of the air conditioning hot liquid circuit 108. Accordingly, the thermal medium liquid flowing through the pipeline of the air conditioning hot liquid circuit 108 is heated by the heat of the condenser 59 when the coolant circuit 113 is operated in a heating operation mode. The thermal medium liquid of the air conditioning hot liquid circuit 108 heated by the condenser 59 is heat-exchanged with the conditioning air in the heater core 55 disposed in the air-conditioning duct 51.

Further, in the embodiment, the compressor 21, the condenser 59, and so on, of heat pump cycle constitute an electric power consumption type temperature raising device. The compressor 21 is driven by an electrically operated driving motor. Accordingly, electric power is consumed by an operation of the compressor 21.

The vehicle 101 of the embodiment is distinguished from the first embodiment in that the air-conditioning device 110 uses the heat pump cycle and the heater core 55 is heated by the heat of the condenser 59 heated through the heat pump cycle but the other configurations are similar thereto. For this reason, substantially the same effect as the first embodiment can be obtained.

Then, a third embodiment shown in FIG. 6 to FIG. 9 will be described.

A vehicle equipped with an electric motor (hereinafter, referred to as "a vehicle 201") according to the embodiment is an electric vehicle in which an engine serving as a driving source is not provided.

The vehicle 201 of the embodiment is distinguished from the first embodiment in that the air conditioning hot liquid circuit 8 for heating of the air-conditioning device 10 is arranged so as to be connected or disconnected with respect to a battery cooling circuit 61 configured to cool the electrical storage device 16 other than an engine cooling circuit. Other configurations are substantially the same as the first embodiment.

For this reason, common parts with the first embodiment are designated by the same reference numerals and overlapping description will be omitted. In the embodiment, the battery cooling circuit 61 constitutes a heat source cooling circuit.

Figure 6:
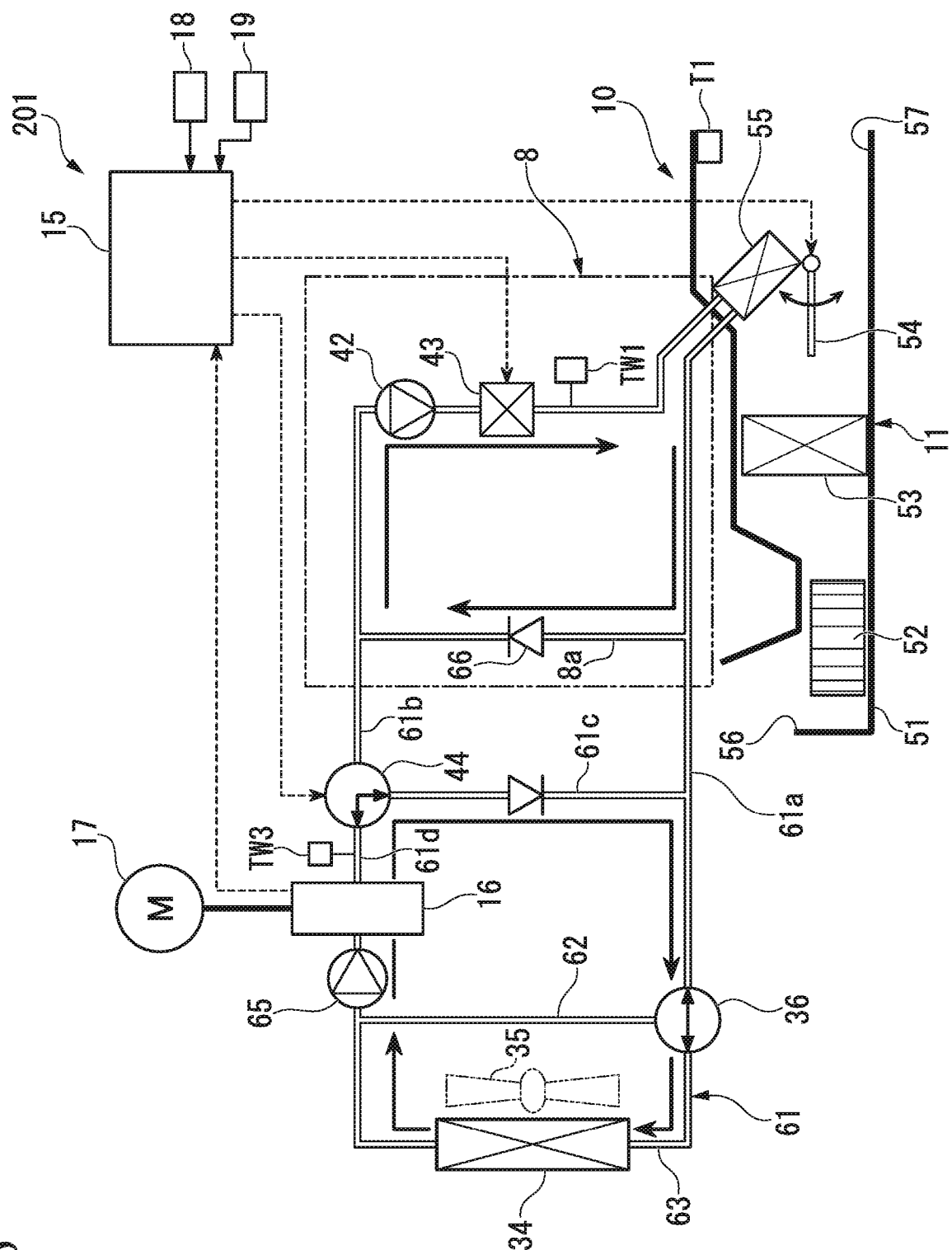
FIG. 6 is a schematic configuration view of a vehicle equipped with an electric motor according to a third embodiment of the present invention.

FIG. 6 is a view showing a schematic configuration of the vehicle 201.

As shown in FIG. 6, the battery cooling circuit 61 includes an electrically operated pump 65 disposed upstream from a battery 16. A passage of the battery cooling circuit 61 that connects a downstream side of the battery 16 and a suction section of a pump 65 is branched off into a main passage 62 and a bypass passage 63, and the radiator 34 configured to radiate heat of thermal medium liquid to the outside air is installed in the bypass passage 63. The cooling fan 35 driven under control by the controller 15 is attached to the radiator 34. In addition, the thermostat 36 is installed on a branch section between the main passage 62 and the bypass passage 63. The thermostat 36 closes the bypass passage 63 while the thermal medium liquid in the battery cooling circuit 61 has a temperature lower than the predetermined temperature (the first predetermined temperature), and opens the bypass passage 63 and flows the thermal medium liquid to the radiator 34 when the temperature of the thermal medium liquid becomes the predetermined temperature (the first predetermined temperature) or more.

In addition, a portion of the battery cooling circuit 61 close to a disposition section of the thermostat 36 is connected to an upstream section of the return passage 8a of the air conditioning hot liquid circuit 8 by a connecting passage 61a. In addition, a portion of the battery cooling circuit 61 close to a downstream section of the electrical storage device 16 is connected to a downstream section of the return passage 8a of the air conditioning hot liquid circuit 8 by a connecting passage 61b. In the battery cooling circuit 61, a return passage 61c is installed between a connecting section of the connecting passage 61a of one side and a connecting section of the connecting passage 61b of the other side. The connecting passage 61b of the other side is connected to an outlet passage section 61d of the battery cooling circuit 61 downstream from the electrical storage device 16. The flow path switching valve 44 such as a 3-way valve or the like is installed on a joining connecting section of three parts, i.e., the outlet passage section 61d, the connecting passage 61b of the other side, and the return passage 61c. The flow path switching valve 44 can switch a flow path under control by the controller 15.

In addition, a liquid temperature sensor TW3 configured to detect a liquid temperature of the thermal medium liquid in the outlet passage section 61d and output the detected liquid temperature to the controller 15 is installed on the outlet passage section 61d of the battery cooling circuit 61.

In FIG. 6, the flow path switching valve 44 connects the outlet passage section 61d and the return passage 61c, and shuts the connecting passage 61b with respect to them (the outlet passage section 61d and the return passage 61c). In this state, the air conditioning hot liquid circuit 8 and the battery cooling circuit 61 are in a shut state, and the circuits are independently provided such that the thermal medium liquid circulates therethrough.

Figure 7:
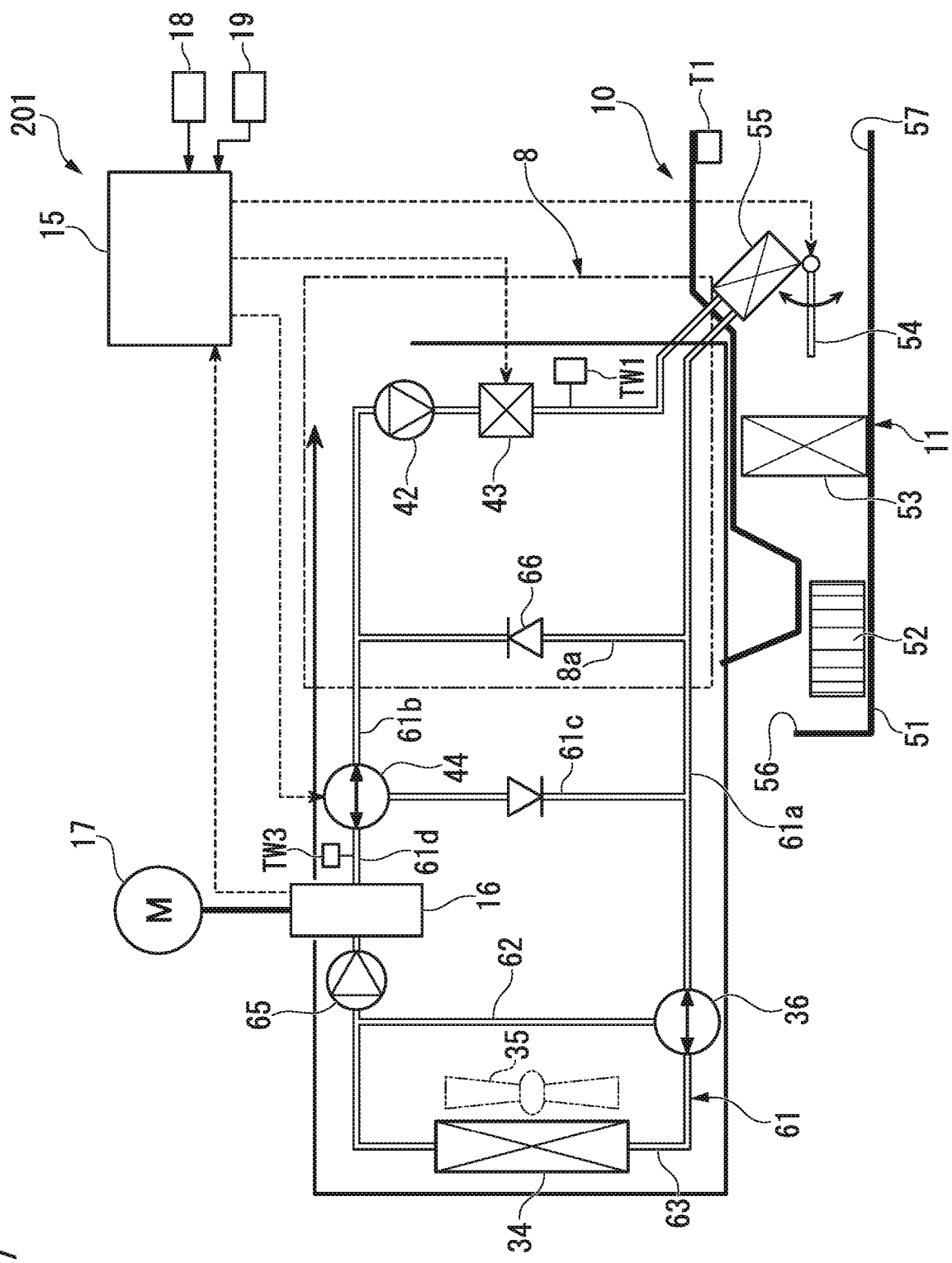
FIG. 7 is a schematic configuration view of the vehicle equipped with an electric motor according to the third embodiment of the present invention.
Figure 9:
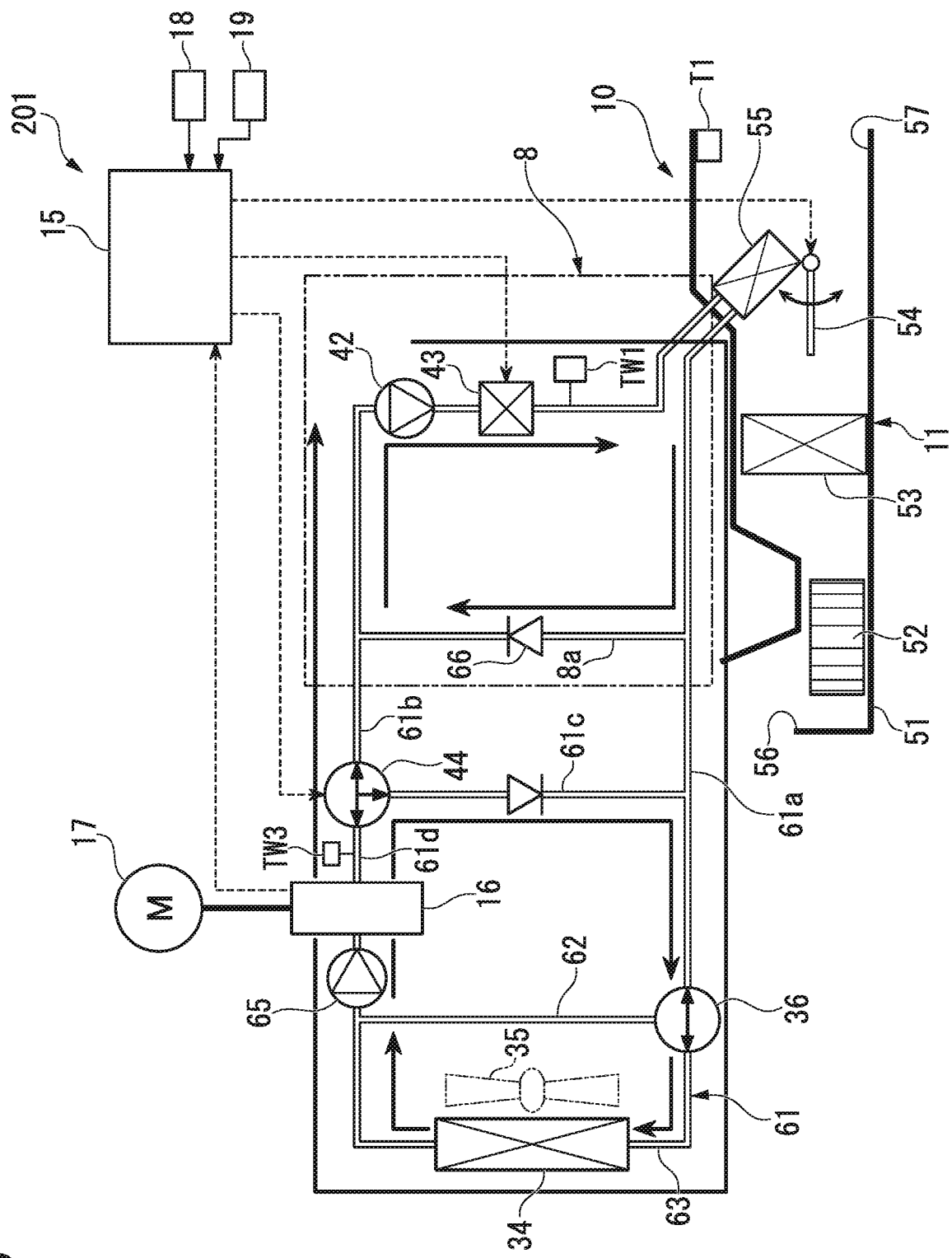
FIG. 9 is a schematic configuration view of the vehicle equipped with an electric motor according to the third embodiment of the present invention.

FIG. 7 and FIG. 9 are views showing schematic configurations of the vehicle 201 similar to FIG. 6. While FIG. 6, FIG. 7 and FIG. 9 show similar schematic configurations of the vehicle 201, states of the flow path switching valve 44 are different from each other.

In FIG. 7, the flow path switching valve 44 connects the outlet passage section 61d and the connecting passage 61b, and shuts the return passage 61c with respect to them (the outlet passage section 61d and the connecting passage 61b). In this state, the air conditioning hot liquid circuit 8 and the battery cooling circuit 61 are in a connection state, and the thermal medium liquid circulates through both of the circuits.

In FIG. 9, the flow path switching valve 44 simultaneously connects three of the outlet passage section 61d, the return passage 61c and the connecting passage 61b. In this state, the air conditioning hot liquid circuit 8 and the battery cooling circuit 61 are partially connected, and a flow rate of the thermal medium liquid flowing through the passages can be adjusted according to outputs or the like of the pumps 42 and 46 in the circuits.

Like the first embodiment, the controller 15 of the embodiment controls the electric motor 17 and the electrical storage device 16 according to a driving operation or a traveling condition and, when it is determined that overcharge regeneration is performed (regenerative braking is performed by the electric motor 17 in a state in which a state of charge of the electrical storage device 16 is a predetermined value or more), performs active electric power consumption using the air-conditioning device 10.

In addition, the controller 15 determines whether the temperature of the thermal medium liquid in the air conditioning hot liquid circuit 8 is higher than the temperature of the thermal medium liquid in the battery cooling circuit 61 (the heat source cooling circuit) on the basis of the detection information of the liquid temperature sensors TW1 and TW3. The controller 15 controls the flow path switching valve 44 and causes the air conditioning hot liquid circuit 8 and the battery cooling circuit 61 to be in a blocked state as shown in FIG. 6 when it is determined that the temperature of the thermal medium liquid in the air conditioning hot liquid circuit 8 is not higher than the temperature of the thermal medium in the battery cooling circuit 61. As a result, the thermal medium liquid in the air conditioning hot liquid circuit 8 circulates therethrough only.

In addition, the controller 15 controls the flow path switching valve 44 and causes the air conditioning hot liquid circuit 8 and the battery cooling circuit 61 to be in a connection state as shown in FIG. 6 when it is determined that the temperature of the thermal medium liquid in the air conditioning hot liquid circuit 8 is higher than the temperature of the thermal medium in the battery cooling circuit 61. As a result, the thermal medium liquid circulates through the insides of the air conditioning hot liquid circuit 8 and the battery cooling circuit 61. Accordingly, heat of the electric heater 43 can be accumulated in the thermal medium liquid upon overcharge regeneration and electric power consumption by the electric heater 43 can be increased under the control.

Further, when the temperature of the thermal medium in the battery cooling circuit 61 is higher than the predetermined temperature (the first predetermined temperature), the thermostat 36 is operated to perform heat radiation of the thermal medium liquid in the radiator 34, and thus, electric power consumption by the electric heater 43 is continued.

The vehicle 201 of the embodiment is distinguished from the first embodiment in that the air conditioning hot liquid circuit 8 can be connected or disconnected with respect to the battery cooling circuit 61 instead of the engine cooling circuit but other configurations are the same basic configurations as the first embodiment. For this reason, substantially the same effect as the first embodiment can be obtained.

Figure 8:
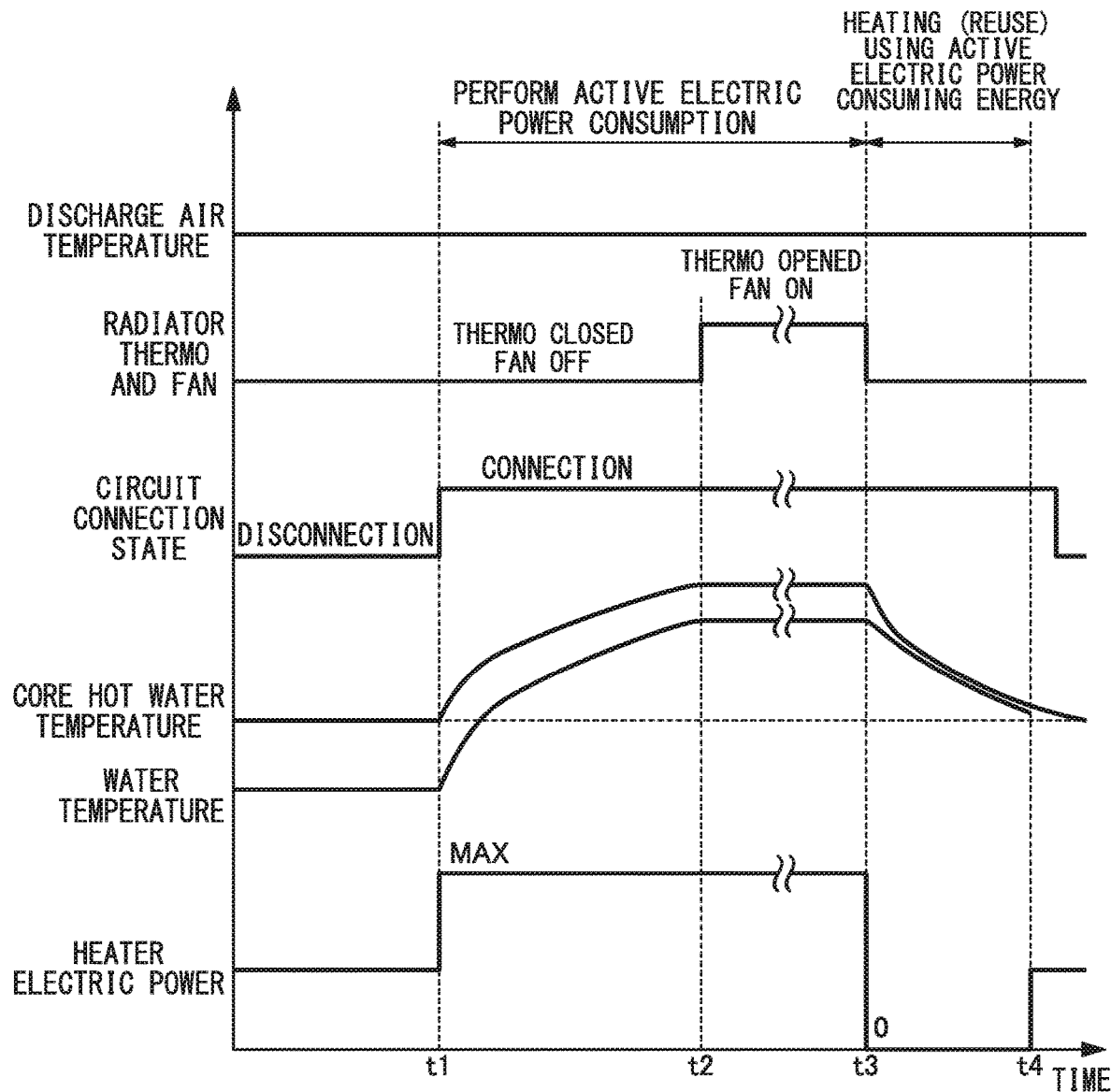
FIG. 8 is a timing chart for explaining states of parts of the vehicle equipped with an electric motor according to the third embodiment of the present invention.

FIG. 8 is a timing chart corresponding to FIG. 4 of the first embodiment, and as shown in the drawing, when the engine cooling circuit and the battery cooling circuit 61 are replaced, substantially the same function as the first embodiment is obtained. In addition, while the electric heater 43 constitutes the electric power consumption type temperature raising device in the embodiment, a temperature raising device may be constituted by a compressor or a condenser of a heat pump system like the second embodiment.

Further, the present invention is not limited to the embodiments and various design changes may be made without departing from the scope of the present invention. For example, while the vehicle equipped with an electric motor of the embodiment is the hybrid vehicle on which the engine and the electric motor are mounted, the vehicle equipped with an electric motor is not limited to the hybrid vehicle and may be an electric vehicle or a fuel cell vehicle as long as the vehicle is equipped with an electric motor.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle equipped with an electric motor, comprising:
an electric motor configured to perform a regenerative braking;
an electrical storage device electrically connected to the electric motor;
an air-conditioning device configured to perform air conditioning in a passenger compartment of the vehicle;
a heat source cooling circuit configured to cool a heat source by causing a thermal medium liquid to flow therethrough; and
a controller configured to control at least the electric motor, the electrical storage device, the air-conditioning device, and the heat source cooling circuit,
wherein the air-conditioning device includes a heater core configured to perform a heat exchange with a conditioning air, an air conditioning hot liquid circuit configured to cause a thermal medium liquid to flow through the heater core, and an electric power consumption temperature raising device configured to raise a temperature of the thermal medium liquid flowing through the heater core,
in a case in which the regenerative braking is performed by the electric motor when a state of charge of the electrical storage device is a predetermined value or more, the controller raises the temperature of the thermal medium liquid passing through the heater core by using the temperature raising device and switches a connection and a shutting between the air conditioning hot liquid circuit and the heat source cooling circuit according to each of a temperature of the thermal medium liquids inside the air conditioning hot liquid circuit and the heat source cooling circuit,
the controller connects the air conditioning hot liquid circuit to the heat source cooling circuit when the temperature of the thermal medium liquid inside the air conditioning hot liquid circuit is higher than the temperature of the thermal medium liquid inside the heat source cooling circuit,
in a case a heating requirement is present when the air-conditioning device is operated in a heating operation mode, the controller connects the air conditioning hot liquid circuit to the heat source cooling circuit only when the temperature of the thermal medium liquid in the air conditioning hot liquid circuit is a second predetermined temperature or higher, and
when there is no heating requirement, regardless of the temperature of the thermal medium liquid in the air conditioning hot liquid circuit, the controller connects the air conditioning hot liquid circuit to the heat source cooling circuit when the temperature of the thermal medium liquid in the air conditioning hot liquid circuit is higher than the temperature of the thermal medium liquid in the heat source cooling circuit.

2. The vehicle equipped with an electric motor according to claim 1,
wherein the heat source cooling circuit comprises a heat exchanger configured to perform a heat exchange with outside air, and a thermal medium liquid flows through the heat exchanger when a temperature of the thermal medium liquid located at downstream from the heat source is a first predetermined temperature or higher.

3. The vehicle equipped with an electric motor according to claim 1,
wherein the second predetermined temperature is set according to an air conditioning demand medium liquid temperature of the heater core.

4. The vehicle equipped with an electric motor according to claim 3,
wherein the air conditioning demand medium liquid temperature is set according to at least an air conditioning set temperature set by an occupant.

5. A vehicle equipped with an electric motor, comprising:
an electric motor configured to perform a regenerative braking;
an electrical storage device electrically connected to the electric motor;
an air-conditioning device configured to perform air conditioning in a passenger compartment of the vehicle;
a heat source cooling circuit configured to cool a heat source by causing a thermal medium liquid to flow therethrough; and
a controller configured to control at least the electric motor, the electrical storage device, the air-conditioning device, and the heat source cooling circuit,
wherein the air-conditioning device includes a heater core configured to perform a heat exchange with a conditioning air, an air conditioning hot liquid circuit configured to cause a thermal medium liquid to flow through the heater core, and an electric power consumption temperature raising device configured to raise a temperature of the thermal medium liquid flowing through the heater core, in a case in which the regenerative braking is performed by the electric motor when a state of charge of the electrical storage device is a predetermined value or more, the controller raises the temperature of the thermal medium liquid passing through the heater core by using the temperature raising device and switches a connection and a shutting between the air conditioning hot liquid circuit and the heat source cooling circuit according to (i) each of a temperature of the thermal medium liquids inside the air conditioning hot liquid circuit and the heat source cooling circuit and (ii) a presence of a heating requirement, the controller is configured to determine that there is no heating requirement in a case the air-conditioning device is operated in a mode except a heating operation mode and to determine that the heating requirement is present in a case the air-conditioning device is operated in the heating operation mode, and when there is no heating requirement, regardless of the temperature of the thermal medium liquid in the air conditioning hot liquid circuit, the controller connects the air conditioning hot liquid circuit to the heat source cooling circuit when the temperature of the thermal medium liquid in the air conditioning hot liquid circuit is higher than the temperature of the thermal medium liquid in the heat source cooling circuit.

* * * * *